Figure 1:
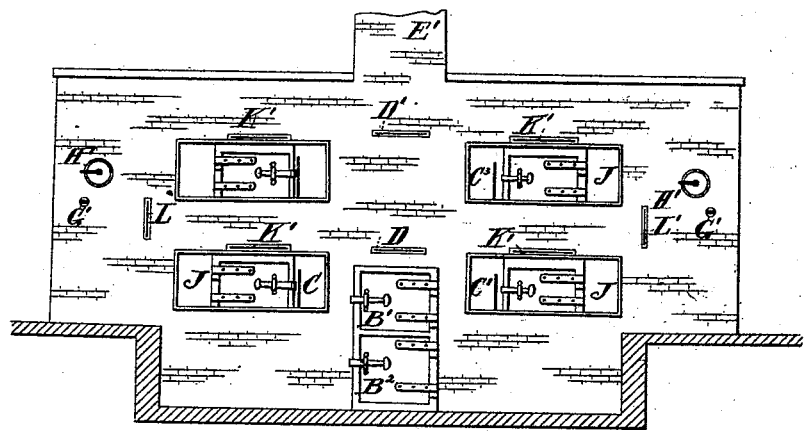

(No Model.)  3 Sheets—Sheet 1.

W. MORTON.
BAKING OVEN.

No. 496,838.  Patented May 2, 1893.

Witnesses:
Rol. A. Fitzgerald
Geo. E. Frech

Inventor:
William Morton
per Pattison & Nesbit, attys.

(No Model.) 3 Sheets—Sheet 2.
W. MORTON.
BAKING OVEN.

No. 496,838. Patented May 2, 1893.

Witnesses:
Rob. A. Fitzgerald.
Geo. E. Freck.

Inventor:
William Morton
per
Pattison & Nesbit attys (No Model.) 3 Sheets—Sheet 3.

W. MORTON.
BAKING OVEN.

No. 496,838. Patented May 2, 1893.

Witnesses:
Rol. A. Fitzgerald
Geo. E. Freeh

Inventor:
William Morton
per Pattison & Nesbit attys

UNITED STATES PATENT OFFICE.

WILLIAM MORTON, OF KIRKDALE, ENGLAND.

BAKING-OVEN.

SPECIFICATION forming part of Letters Patent No. 496,838, dated May 2, 1893.

Application filed July 9, 1892. Serial No. 439,517. (No model.) Patented in England September 7, 1891, No. 15,150; in New South Wales July 25, 1892, No. 3,882, and in Canada July 27, 1892, No. 39,491.

*To all whom it may concern:*

Be it known that I, WILLIAM MORTON, a subject of the Queen of Great Britain and Ireland, residing at Kirkdale, near Liverpool, in the county of Lancaster, England, have invented Improvements in Baking-Ovens, (for which patents have been granted in the following countries: Canada, No. 39,491, dated July 27, 1892; New South Wales, No. 3,882, dated July 25, 1892, and Great Britain, No. 15,150, dated September 7, 1891,) of which the following is a specification.

This invention has reference to the construction of the furnace and flues of baking ovens and is designed to reduce the consumption of fuel and to enable the temperature of each oven of a series of ovens when grouped together and heated by one fire, to be easily regulated.

At present with ovens constructed on the plan known by bakers as the Scotch oven, that is where the heated gases produced by the fire pass through and heat the air and brickwork of the oven and escape by a flue to the chimney, one fire is employed for each oven. When the oven becomes too hot the fire is generally drawn, the oven door opened and the superfluous heat passes away unutilized. Such ovens require a varying temperature when a mixed class of baking is done, and cooling of the oven or ovens as before described not only result in waste of fuel but loss of time. According to this invention we group say two or four such ovens together and heat them all by one fire only, providing suitable dampers and flues connecting the ovens in such a manner that the heated gases from the fire can pass first through any one of the ovens and thence to the chimney, secondly from one oven to another one and thence to the chimney; or thirdly, directly to the chimney. The fire place or furnace may be formed midway between say two ovens placed side by side. Near the end of the grate bars is a bridge formed with openings provided with regulating dampers for admitting heated gases into one or other of the before mentioned ovens; while above or on one side of these dampers is a by pass flue and damper whereby communication can be opened with another pair of ovens placed, it may be on the same level but preferably above the first mentioned pair. Thus separate inlet flues and dampers are provided to each oven. The discharging flues from each of the ovens are each provided with dampers and connect with the chimney stack. These flues are so arranged that a connection can be made between any two or more of the ovens by opening the proper dampers. By this construction the ovens can be heated in various ways. For example if one oven, for instance the lower one, be required at a high temperature and another one at a much lower temperature, then by regulating the dampers, the heated gases from the fire may be caused to pass through the first oven and thence through the second oven or the first damper may be partly opened to allow the greater portion of the heated gases to pass to the first oven and a smaller quantity to the second oven according to requirements. If only one oven be required for the time being, the heated gases escaping therefrom may be passed through the remaining ovens of the group so as to temper or partially heat them ready for baking. It will thus be understood that by this arrangement of dampers and flues the ovens can be retained at a fixed heat from one fire without losing time or wasting fuel.

The furnace and flues may be constructed in modified forms to suit different constructions of ovens without departure from the essential features of the invention.

By this invention fuel is saved, less space is occupied by the ovens, and the loss of time required to cool an overheated oven to a degree suitable for a different class of baking is reduced.

Figure 2:
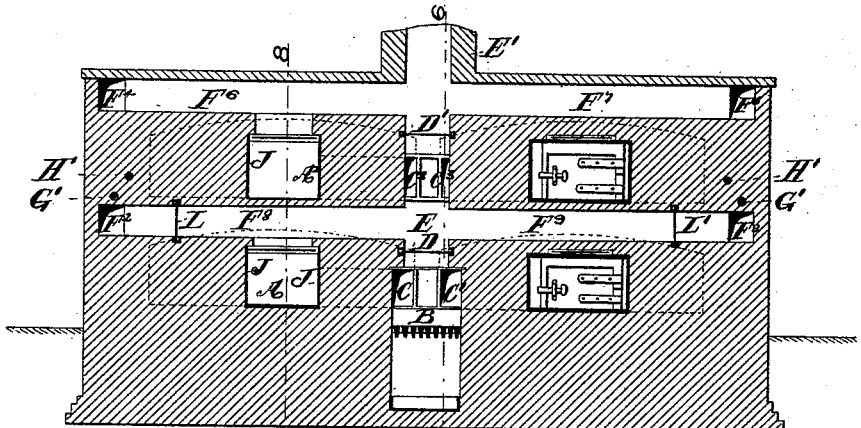
Figure 3:
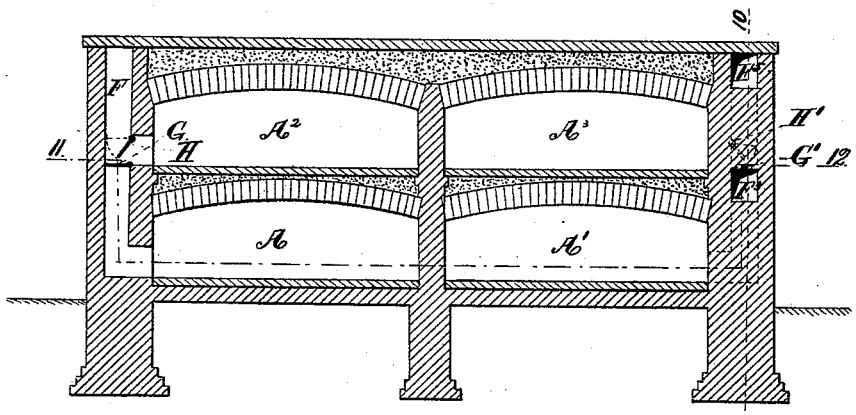
Figure 4:
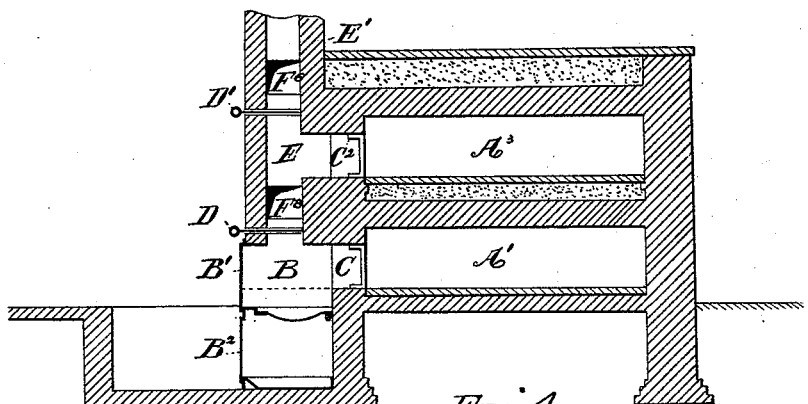
Figure 6:
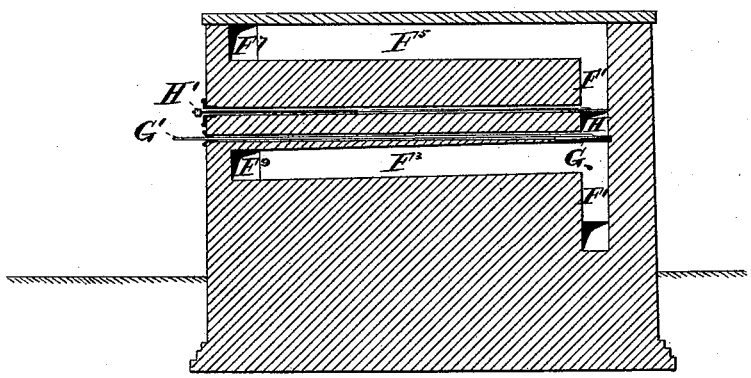
Figure 7:
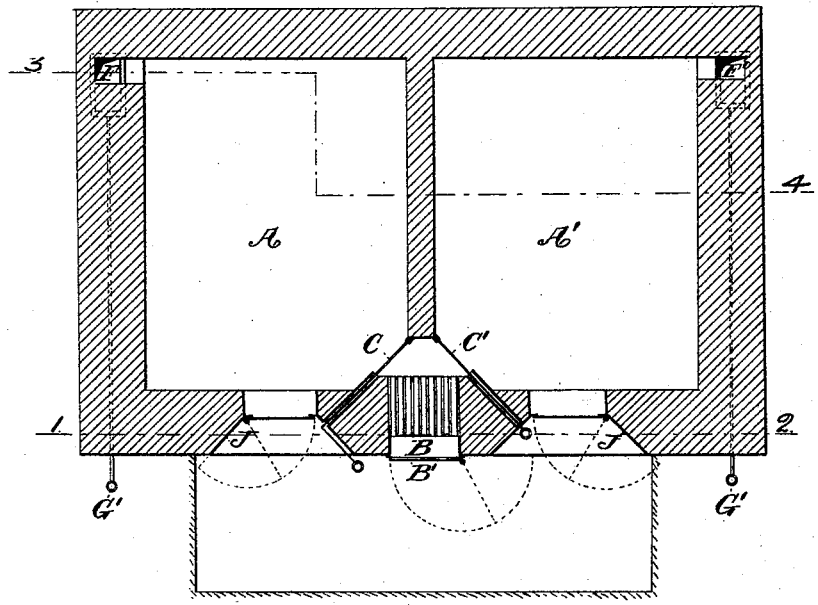
Figure 8:
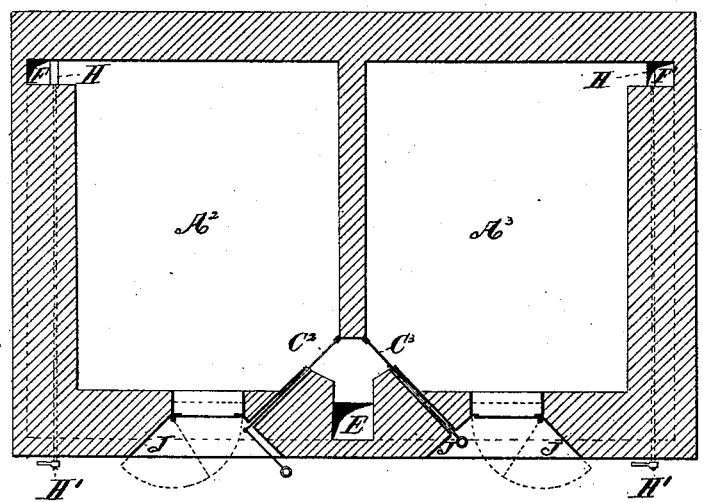

In the accompanying drawings Figure 1. is a front elevation showing the general arrangement of a group of four ovens connected according to this invention. Fig. 2. is a sectional elevation of the front wall taken on the line 1. 2 of Fig. 7. showing the oven, doorways, flues and other parts. Fig. 3. is a sectional elevation taken on the line 3. 4. of Fig. 7. Figs. 4. and 5. are longitudinal sections taken on the lines 5. 6 and 7. 8 respectively of Fig. 2. Fig. 6. is a sectional elevation taken on the line 9. 10. of Fig. 3 and shows the arrangement of flues and dampers formed in the outside walls. Fig. 7. is a sectional plan taken on the irregular line 11. 12 of Fig. 3. showing the lower ovens fire place and corner dampers. Fig. 8. is a similar view to Fig. 7. but showing the upper ovens with inlet and outlet dampers and uptake flue.

A. A'. A$^2$ and A$^3$ are four ovens heated from one fire place B. which is provided with fire and ash pit doors B' B$^2$. a bridge, and corner inlet dampers C. C'. placed at the outer adjacent corner of the lower ovens A. A'. A little above these dampers and over the furnace bars is a horizontal damper D. arranged to slide in guides in the front wall Figs. 1. 2. and 4. This damper serves to control the communication between the fire place and the main uptake flue E. which communicates with the chimney E'. Above the damper D. the flue E. branches off toward and into the upper ovens A$^2$. A$^3$. The communication with these ovens being controlled by another set of corner dampers C,. C$^3$. shown in Figs. 4. and 8.

D'. is a horizontal damper placed above the level of these corner dampers so that when the fire is first lighted and until it has burned clear, the smoke and the heated gases can pass direct to the chimney when the dampers D. and D'. are drawn without entering any of the ovens. In the opposite corners of the ovens to those provided with the inlet dampers are uptake exit flues F. and F'. that extend vertically from the floor of the lower ovens A A'. to a higher level than the arched roof of the upper ovens. The flue F. is connected with longitudinal side flues F$^2$ and F$^4$. and the flue F'. is connected with the longitudinal side flues F$^3$. and F$^5$. as shown in Figs. 2. 3 and 6.

Each of the vertical flues F. F'. is provided at a point between its connection with the horizontal flues, with a damper G. connected to a rod G'. that extends through the front wall of the ovens and is provided with a suitable handle as shown in Figs. 1. 3. 6 and 7. The exit openings of the upper ovens are each controlled by a pivoted damper H. that is attached to and regulated by another rod extending through the front wall of the ovens and provided with a handle H'. These dampers H. are each so arranged that it can also close the communication with the upper side flue F$^4$ or F$^5$. as the case may be, that respectively connect with the front flues F$^6$. F$^7$. which are in communication with the uptake flue E. at a point above the roof of the upper ovens. Flues F$^8$. and F$^9$. are similarly arranged and connected with the lower ovens and uptake flue as illustrated.

Figure 5:
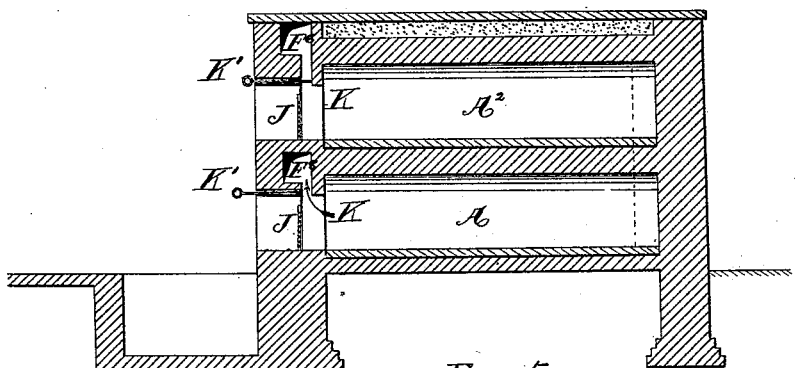

The vertical sides of the oven door frames J. J. may be advantageously made flaring as shown in Figs. 7. and 8. and through the upper side or roof of each of these frames is formed a long narrow slot or passage K that connects with the one or other of the horizontal flues F$^6$ F$^7$ F$^8$ or F$^9$ as indicated in Figs. 2 and 5, and is provided with a damper and handle K'.

The front or outer edge of each door frame against which the oven door closes projects a little below and in front of the under side of the corresponding slot or passage so that steam and heated air or gases, can, when the corresponding damper is drawn pass from the oven through the slot or passage into the flue above it instead of into the bake house.

The rods to which the corner dampers C. C'. C$^2$. and C$^3$ are attached, are preferably each made with a hinge so that when they are drawn out as shown on the left hand side of Figs. 7. and 8, the projecting rods may be folded back against the door frame.

L. and L'. (Figs. 1. 2.) are vertical dampers arranged within the front flues F$^8$. F$^9$. respectively so that when the door of either of the lower ovens is opened and the corresponding damper L. or L'. is closed cold air will be prevented from flowing directly through the oven and thence to the chimney so as to thereby cool the oven and injuriously affect the draft of air through the furnace.

As will be seen the arrangement of the flues and dampers is such that either of the lower ovens can be worked in conjunction with either of the upper ovens that is to say the the heated gases after passing through one oven may be directed into another one at a higher level. For example if it be required to use ovens A. and A$^3$. the corner damper C. would be drawn and the heated gases after passing diagonally across the oven A. allowed to escape by the uptake flue F. until stopped from ascending any higher by the closed damper G. They would then travel along the side flue F$^2$. (Fig. 2.) and through the front flue F$^8$. to the uptake flue E. through which they would ascend as far as the closed damper D'. where they would enter the oven A$^3$. through the opening controlled by the corner damper C$^3$. which would then be open. The hot gases after flowing through the oven A$^3$. would escape through the uptake flue F'. and side and front flues F$^4$. F$^7$. to the chimney E'. If it be desired to work the two ovens that are directly above the other say A. and A$^2$. together, then the sliding damper G. is drawn and the pivoted damper H. of the upper oven A$^2$. turned to close the upper part of the uptake flue F. The hot gases after escaping from the lower oven A. would then pass through the uptake flue F. and enter the upper oven A$^2$. through the opening controlled by the pivoted damper H. After passing through the said oven A$^2$. the hot gases will pass through the corner opening controlled by the damper C$^2$. into the chimney flue E. In this case the damper D. should be closed and the other damper D' opened. It will thus be understood that by our arrangement of flues and dampers, the temperature of each of the ovens can be quickly controlled, with practically no waste of fuel, to suit varying requirements where different classes of goods are to be baked.

What I claim is—

1. An internally heated baking oven, comprising a single fire place, a single chimney communicating therewith, two or more ovens, each of which has a separate opening in their front wall communicating with said chimney, a damper for each opening, each oven having an opening in its rear end, an uptake flue connecting the said rear openings of said ovens, and a damper in the said chimney above the openings in the front end of said ovens, all combined and operating substantially as shown and described.

2. A group of internally heated baking ovens arranged in two pairs A. A². and A'. A³. and having a fire place B. between the two pairs, an uptake flue E. with dampers D. D'. and chimney, dampers controlling the communications between said main uptake flue and said ovens, uptake exit flues F. F'. each fitted with a damper C. and adapted to be placed in communication with each of the ovens of a pair, dampers G. each controlling the communication between the upper oven of a pair and the corresponding uptake exit flue, means for operating said dampers, horizontal flues F⁶. F⁷. connecting said uptake exit flues direct with said chimney, and horizontal flues F⁸. F⁹. connecting said exit flues at points below said dampers G. with said main uptake flue at points between said dampers D. D'. substantially as herein described for the purpose specified.

In testimony whereof I have signed my name to this specification in the presence of two subscribing witnesses.

WILLIAM MORTON.

Witnesses:
F. M. C. SCOTT,
J. CUFF,
*Both of 89 Victoria Street, Liverpool.*